United States Patent [19]
Suzuki

[11] Patent Number: 5,930,518
[45] Date of Patent: Jul. 27, 1999

[54] ARITHMETIC UNIT

[75] Inventor: Hidetoshi Suzuki, Yokohama, Japan

[73] Assignee: Matsushita Electric Industrial Co., Ltd., Osaka, Japan

[21] Appl. No.: 08/769,419

[22] Filed: Dec. 19, 1996

[30] Foreign Application Priority Data

Dec. 20, 1995 [JP] Japan ................................. 7-331434

[51] Int. Cl.$^6$ .................................................. G06F 9/302
[52] U.S. Cl. ....................................................... 395/800.01
[58] Field of Search ........................ 395/800.35, 800.01, 395/2.09

[56] References Cited

U.S. PATENT DOCUMENTS

| | | | |
|---|---|---|---|
| 5,131,008 | 7/1992 | Kazecki et al. | 375/344 |
| 5,251,232 | 10/1993 | Nonami | 375/5 |
| 5,282,197 | 1/1994 | Kreitzer | 370/69.1 |
| 5,319,573 | 6/1994 | Corleto et al. | 364/514 |
| 5,517,436 | 5/1996 | Andreas et al. | 364/736 |
| 5,519,640 | 5/1996 | Ganesan et al. | 364/514 R |

FOREIGN PATENT DOCUMENTS

| | | |
|---|---|---|
| 52-24923 | 9/1993 | Japan . |
| 52-98093 | 11/1993 | Japan . |
| 62-50856 | 9/1994 | Japan . |

OTHER PUBLICATIONS

Joe Mitola, "Sotfware Radios," IEEE Communications Magazine, May 1995, vol. 33, No. 5, pp. 24–54.

Raymond J. Lackey, et al., "Speakeasy: The Military Software Radio," IEEE Communications Magazine, May 1995, vol. 33, No. 5, pp. 56–68.

John L. Hennessy et al., "Computer Architecture A Quantitative Approach Second Edition", Chapter 3, pp. 125–137.

Primary Examiner—David Y. Eng
Attorney, Agent, or Firm—Stevens, Davis, Miller & Mosher, L.L.P.

[57] ABSTRACT

An arithmetic unit performs a demodulating operation for a received signal, a synchronizing operation based on a demodulated signal, a voice decoding operation for the demodulated signal, a voice encoding operation for a voice, and a modulating operation for a coded voice by a pipeline processing method. The arithmetic unit has an arithmetic portion for alternately performing a desired one of the demodulating operation, the modulating operation and the synchronizing operation and a desired one of the voice decoding operation and the voice encoding operation. The arithmetic unit further has a first storage portion for storing a result of the desired one of the demodulating operation, the modulating operation and the synchronizing operation performed by the arithmetic portion; and a second storage portion for storing a result of the desired one of the voice decoding operation and the voice encoding operation performed by the arithmetic portion.

12 Claims, 7 Drawing Sheets

ARITHMETIC UNIT

BACKGROUND OF THE INVENTION

1. Field of the Invention

The present invention relates to an arithmetic unit, and particularly to an arithmetic unit adapted to a processor for audio communication or digital signal processing.

2. Description of the Related Art

Processors for voice communication and digital signal processing generally use pipelining for executing a plurality of instructions simultaneously in overlapping (as described, for example, in "COMPUTER ARCHITECHTURE A QUANTITATIVE APPROACH SECOND EDTION", Chapter 3, written by John L. Hennessy and David A. Patterson).

In pipelining, arithmetic ability can be improved by subdividing the pipelining into pipeline stages (processing units) so as to increase the number of instructions to be executed simultaneously. Further, because the number of logic stages per pipeline stage can be reduced, the operating rate can be improved.

Figure 1:
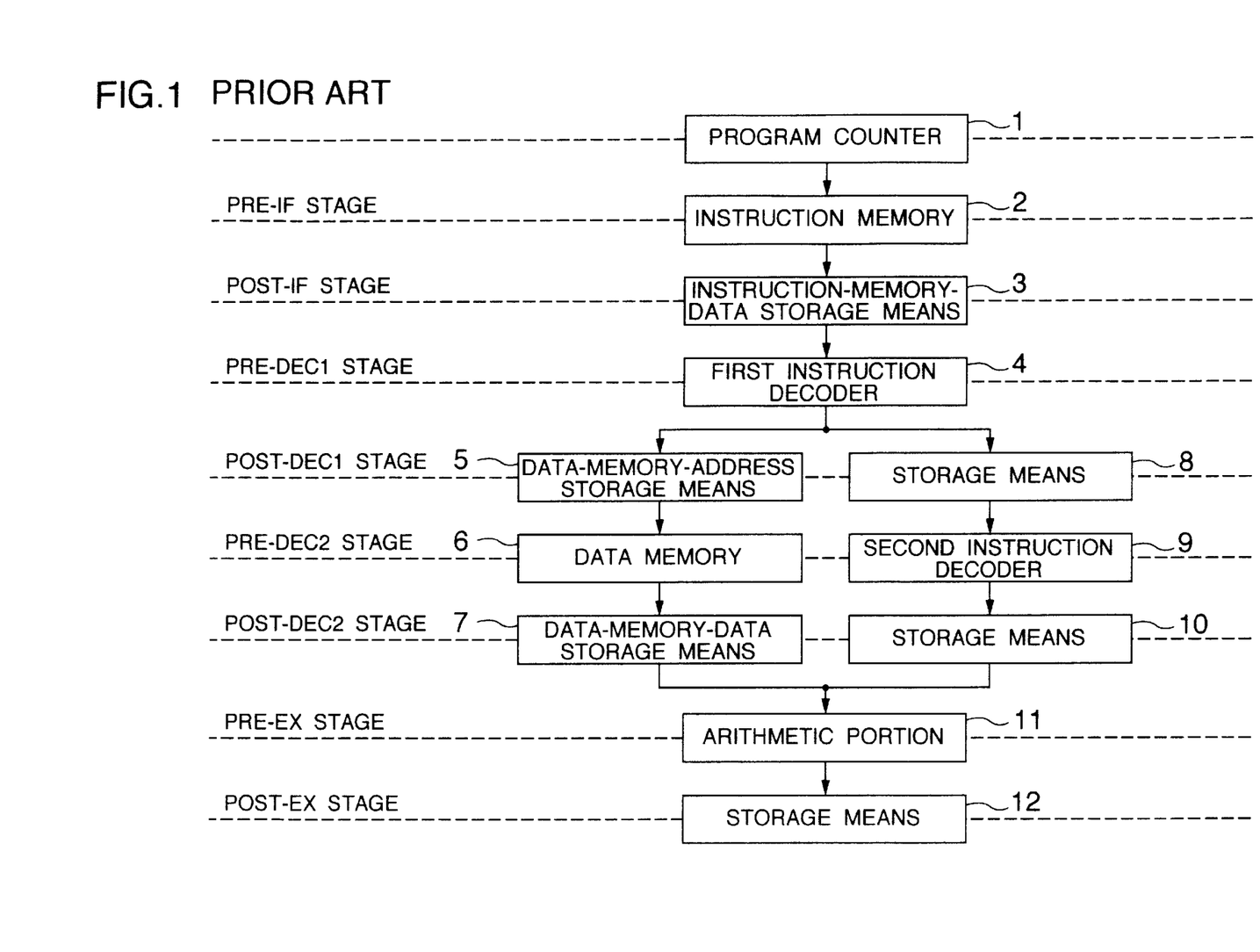
FIG. 1 is a schematic block diagram showing a conventional arithmetic unit having eight pipeline stages.

Pipelining in a conventional arithmetic unit having eight pipeline stages will be described below with reference to FIGS. 1 and 2.

The arithmetic unit has a program counter 1 for indicating an access address of an instruction memory 2, the instruction memory 2 for storing instruction data, an instruction-memory-data storage means 3 for storing instruction data which is given from the instruction memory 2, and a first instruction decoder 4 for decoding instruction data which is given from the instruction-memory-data storage means 3 and outputting a data memory address and a result of temporary decoding of an instruction (hereinafter referred to as "an instruction-temporary-decoded-result").

The arithmetic unit further has a data-memory-address storage means 5 for holding the data memory address given from the first instruction decoder 4, a data memory 6 which is accessed on the basis of the data memory address given from the data-memory-address storage means 5 and in which an output data is stored, and a data-memory-data storage means 7 for holding the output data given from the data memory 6.

The arithmetic unit further has a storage means 8 for holding the instruction-temporary-decoded-result given from the first instruction decoder 4, a second instruction decoder 9 for decoding the instruction-temporary-decoded-result given from the storage means 8, a storage means 10 for holding the decoded result of the second instruction decoder 9, an arithmetic portion 11 for performing an arithmetic operation for the output data given from the data-memory-data storage means 7 on the basis of contents indicated by the decoded result given from the storage means 10, and a storage means 12 for holding the arithmetic result given from the arithmetic portion 11.

The operations in respective pipeline stages, shown in FIG. 1, of the arithmetic unit configured as described above will be described below with reference to FIG. 2 which is a pipeline configuration view.

Pre-IF Stage and Post-IF Stage

At time T1, an address is outputted from the program counter 1 to the instruction memory 2 and then the value of the program counter 1 is incremented by one (pre-IF stage for instruction i). At time T2, an instruction data stored in the address which is given from the program counter 1 to the instruction memory 2 at time T1 is outputted from the instruction memory 2 to the instruction-memory-data storage means 3 and held in the instruction-memory-data storage means 3 (post-IF stage for instruction i). Here, pipeline latches may be provided in the inside of the instruction memory 2 or a wave pipeline configuration is used in the instruction memory 2 in order to separate an IF stage into a pre-IF stage and a post-IF stage. Incidentally, in the wave pipeline configuration, a plurality of waves for data propagation are disposed among storage devices by performing clocking at a rate higher than the propagation delay of a combination circuit (JP-A-7-93149).

Incidentally, at time T2, an address is outputted from the program counter 1 to the instruction memory 2 and then the value of the program counter 1 is incremented by one (pre-IF stage for instruction i+1).

Pre-DEC1 Stage and Post-DEC1 Stage

At time T3, the instruction data held in the instruction-memory-data storage means 3 at time T2 is decoded by the first instruction decoder 4 to thereby generate a data memory address and an instruction-temporary-decoded-result to be used in the next DEC2 stage (pre-DEC1 stage for instruction i). At time T4, the data memory address and the instruction-temporary-decoded-result generated at time T3 are held in the data-memory-address storage means 5 and the storage means 8 respectively (post-DEC1 stage for instruction i+1). Here, pipeline latches may be provided in the inside of the first instruction decoder 4 or a wave pipeline configuration may be used in the first instruction decoder 4 in order to separate a DEC1 stage into a pre-DEC1 stage and a post-DEC1 stage.

Incidentally, at time T3, the instruction data stored in the address which is given from the program counter 1 to the instruction memory 2 at time T2 is outputted from the instruction memory 2 to the instruction-memory-data storage means 3 and held in the instruction-memory-data storage means 3 (post-IF stage for instruction i+1) and, at the same time, an address is outputted from the program counter 1 to the instruction memory 2 and then the value of the program counter 1 is incremented by one (pre-IF stage for instruction i+2).

Further, at time T4, the instruction data held in the instruction-memory-data storage means 3 at time T3 is decoded by the first instruction decoder 4 to thereby generate a data memory address and an instruction-temporary-decoded-result to be used in the next DEC2 stage (pre-DEC1 stage for instruction i+1). The instruction data stored in the address which is given from the program counter 1 to the instruction memory 2 at time T3 is outputted from the instruction memory 2 to the instruction-memory-data storage means 3 and held in the instruction-memory-data storage means 3 (post-IF stage for instruction i+2) and, at the same time, an address is outputted from the program counter 1 to the instruction memory 2 and then the value of the program counter 1 is incremented by one (pre-IF stage for instruction i+3).

Pre-DEC2 Stage and Post-DEC2 Stage

At time T5, the data memory 6 is accessed on the basis of the data memory address which is outputted from the data-memory-address storage means 5 and, at the same time, the instruction-temporary-decoded-result held in the storage means 8 at time T4, is decoded by the second instruction decoder 9 into a signal format which is necessary for the next EX stage (pre-DEC2 stage for instruction i). At time T6, the output data from the data memory 6 is held in the data-memory-data storage means 7 and, at the same time, the data decoded by the second instruction decoder 9 is held in the storage means 10 (post-DEC2 stage for instruction i).

Here, pipeline latches may be provided in the inside of the data memory 6 and the second instruction decoder 9 or a wave pipeline configuration may be used in the data memory 6 and the second instruction decoder 9 in order to separate a DEC2 stage into a pre-DEC2 stage and a post-DEC2 stage.

Incidentally, at time T5, the data memory address and the instruction-temporary-decoded-result generated by the first instruction decoder 4 at time T4 are held in the data-memory-address storage means 5 and the storage means 8 respectively (post-DEC1 stage for instruction i+1). The instruction data held in the instruction-memory-data storage means 3 at time T4 is decoded by the first instruction decoder 4 to thereby generate a data memory address and an instruction-temporary-decoded-result to be used in the next DEC2 stage (pre-DEC1 stage for instruction i+2). The instruction data stored in the address which is given from the program counter 1 to the instruction memory 2 at time T4 is outputted from the instruction memory 2 to the instruction-memory-data storage means 3 and held in the instruction-memory-data storage means 3 (post-IF stage for instruction i+3) and, at the same time, an address is outputted from the program counter 1 to the instruction memory 2 and then the value of the program counter 1 is incremented by one (pre-IF stage for instruction i+4).

Further, at time T6, the data memory 6 is accessed on the basis of the data memory address which is outputted from the data-memory-address storage means 5 and, at the same time, the instruction-temporary-decoded-result held in the storage means 8 at time T5 is decoded by the second instruction decoder 9 into a signal format which is necessary for the next EX stage (pre-DEC2 stage for instruction i+1). The data memory address and the instruction-temporary-decoded-result generated by the first instruction decoder 4 at time T5 are held in the data-memory-address storage means 5 and the storage means 8 respectively (post-DEC1 stage for instruction i+2). The instruction data held in the instruction-memory-data storage means 3 at time T5 is decoded by the first instruction decoder 4 to thereby generate a data memory address and an instruction-temporary-decoded-result to be used for the next DEC2 stage (pre-DEC1 stage for instruction i+3). The instruction data stored in the address which is given from the program counter 1 to the instruction memory 2 at time T5 is outputted from the instruction memory 2 to the instruction-memory-data storage means 3 and held in the instruction-memory-data storage means 3 (post-IF stage for instruction i+4) and, at the same time, an address is outputted from the program counter 1 to the instruction memory 2 and then the value of the program counter 1 is incremented by one (pre-IF stage for instruction i+5).

Pre-EX Stage and Post-EX Stage

At time T7, the arithmetic portion 11 performs an arithmetic operation for the output data from the data-memory-data storage means 7 on the basis of contents designated by the output signal of the storage means 10 (pre-EX stage for instruction i). At time T8, the arithmetic result in the arithmetic portion 11 is held in the storage means 12 (post-EX stage for instruction i). Here, pipeline latches may be provided in the inside of the arithmetic portion 11 or a wave pipeline configuration may be used in the arithmetic portion 11 in order to separate an EX stage into a pre-EX stage and a post-EX stage.

Incidentally, at time T7, the output data from the data memory 6 is held in the data-memory-data storage means 7 and, at the same time, the data decoded by the second instruction decoder 9 at time T6 is held in the storage means 10 (post-DEC2 stage for instruction i+1). The data memory 6 is accessed on the basis of the data memory address outputted from the data-memory-address storage means 5 and, at the same time, the instruction-temporary-decoded-result held in the storage means 8 at time T6 is decoded by the second instruction decoder 9 into a signal format which is necessary for the next EX stage (pre-DEC2 stage for instruction i+2). The data memory address and the instruction-temporary-decoded-result generated by the first instruction decoder 4 at time T6 are held in the data-memory-address storage means 5 and the storage means 8 respectively (post-DEC1 stage for instruction i+3). The instruction data held in the instruction-memory-data storage means 3 at time T6 is decoded by the first instruction decoder 4 to thereby generate a data memory address and an instruction-temporary-decoded-result to be used in the next DEC2 stage (pre-DEC1 stage for instruction i+4). The instruction data stored in the address which is given from the program counter 1 to the instruction memory 2 at time T6 is outputted from the instruction memory 2 to the instruction-memory-data storage means 3 and held in the instruction-memory-data storage means 3 (post-IF stage for instruction i+5) and, at the same time, an address is outputted from the program counter 1 to the instruction memory 2 and then the value of the program counter 1 is incremented by one (pre-IF stage for instruction i+6).

Further, at time T8, the arithmetic portion 11 performs an arithmetic operation for the output data from the data-memory-data storage means 7 on the basis of contents designated by the output signal of the storage means 10 (pre-EX stage for instruction i+1). The output data from the data memory 6 is held in the data-memory-data storage means 7 and, at the same time, the data decoded by the second instruction decoder 9 is held in the storage means 10 (post-DEC2 stage for instruction i+2). The data memory 6 is accessed on the basis of the data memory address outputted from the data-memory-address storage means 5 and, at the same time, the instruction-temporary-decoded-result held in the storage means 8 at time T7 is decoded by the second instruction decoder 9 into a signal format which is necessary for the next EX stage (pre-DEC2 stage for instruction i+3). The data memory address and the instruction-temporary-decoded-result generated by the first instruction decoder 4 at time T7 are held in the data-memory-address storage means 5 and the storage means 8 respectively (post-DEC1 stage for instruction i+4). The instruction data held in the instruction-memory-data storage means 3 at time T7 is decoded by the first instruction decoder 4 to thereby generate a data memory address and an instruction-temporary-decoded-result to be used in the next DEC2 stage (pre-DEC1 stage for instruction i+5). The instruction data stored in the address which is given from the program counter 1 to the instruction memory 2 at time T7 is outputted from the instruction memory 2 to the instruction-memory-data storage means 3 and held in the instruction-memory-data storage means 3 (post-IF stage for instruction i+6) and, at the same time, an address is outputted from the program counter 1 to the instruction memory 2 and then the value of the program counter 1 is incremented by one (pre-IF stage for instruction i+7).

As described above, at time T8 in FIG. 2, a post-EX stage for instruction i, a pre-EX stage for instruction i+1, a post-DEC2 stage for instruction i+2, a pre-DEC2 stage for instruction i+3, a post-DEC1 stage for instruction i+4, a pre-DEC1 stage for instruction i+5, a post-IF stage for instruction i+6 and a pre-IF stage for instruction i+7 are executed simultaneously. As a result, there can be provided eight-fold performance compared with the case where the respective stages for the instructions are executed one by one.

The processor having the aforementioned conventional pipeline configuration, however, has the following problems.

(1) When a branch instruction is executed, the cycle (stalling) in which invalid "nop" instructions are issued occurs unless a branch destination is found.

When a branch instruction is executed, the address indicated by the program counter 1 is not determined unless the branch destination is found. The point of time when branch destination is found is after the post-EX stage for the branch instruction is completed. As a result, stalling occurs unless the address indicated by the program counter 1 is determined, so that pipelines cannot be used effectively.

Figure 3:
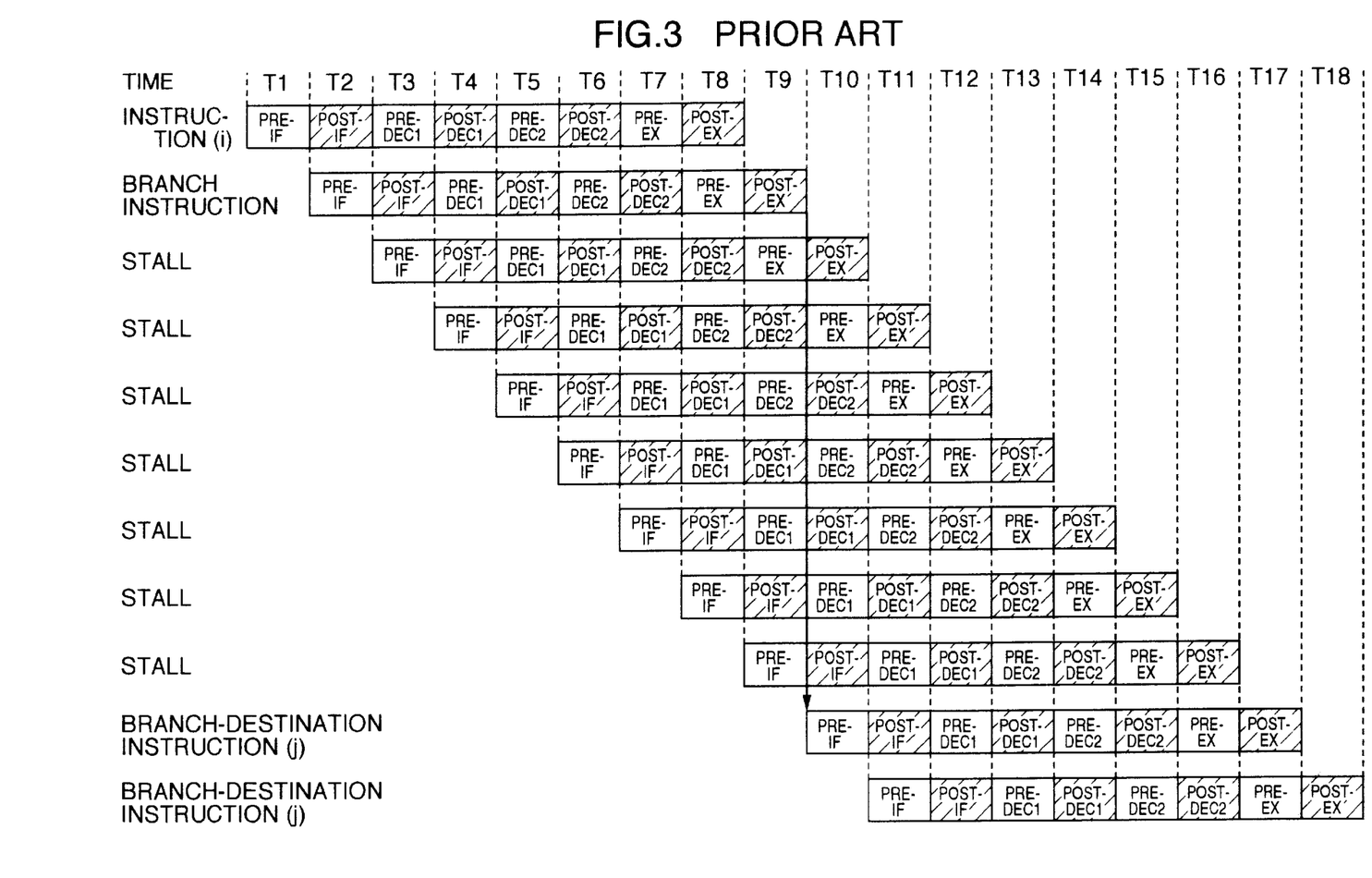
FIG. 3 is a view showing a pipeline configuration at the time of execution of a branch instruction in the arithmetic unit depicted in FIG. 1.

When, for example, the execution of a branch instruction is started at time T2 in FIG. 3, the value of the program counter 1 is not determined unless the post-EX stage for the branch instruction is completed. Accordingly, the branch destination instruction j cannot be issued until the time T9 when the post-EX stage is completed, that is, in a period of time from the time T3 to the time T9, so that pipelines cannot be used effectively.

(2) When instructions using previous arithmetic results are inputted continuously, stalling occurs.

Figure 2:
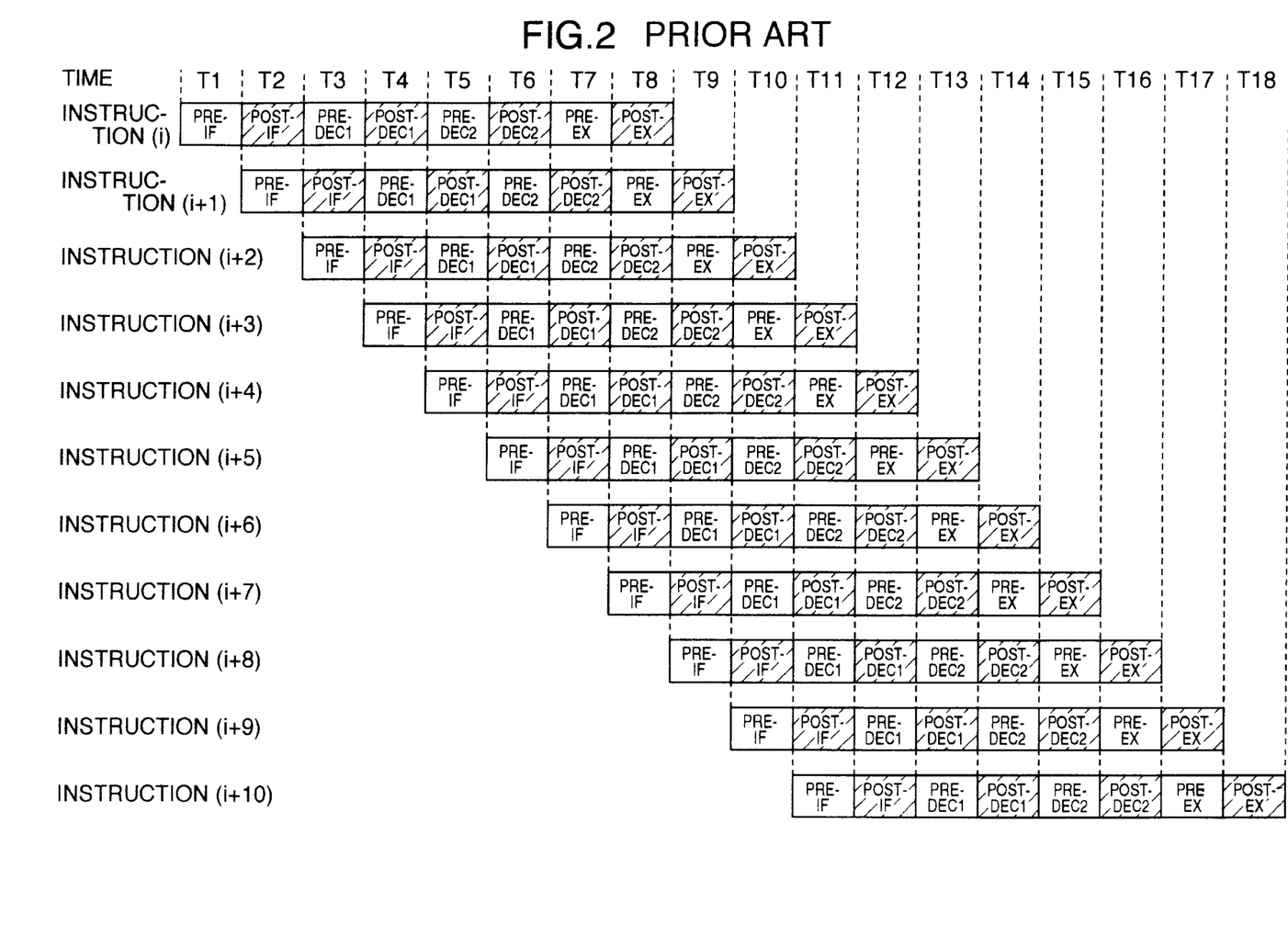
FIG. 2 is a pipeline configuration view for explaining operations in respective pipeline stages of the arithmetic unit depicted in FIG. 1.

Assume now that instruction i in FIG. 2 is an instruction which is such that an arithmetic result of the instruction is determined after the post-EX stage for the instruction is completed. In the eight pipeline stages, the post-EX stage for the instruction i is not determined before the pre-EX stage for the next instruction i+1 is determined. Accordingly, the arithmetic result of the instruction i cannot be used in the instruction i+1. In order to use the arithmetic result of the instruction i in the instruction i+1, occurrence of stalling is required before the execution of the instruction i+1, so that pipelines cannot be used effectively.

SUMMARY OF THE INVENTION

An object of the present invention is to provide an arithmetic unit in which pipelines can be used effectively and, accordingly, arithmetic ability can be improved.

In order to achieve the above object, according to a first aspect of the present invention, an arithmetic unit for performing a demodulating operation for a received signal, a synchronizing operation based on a demodulated signal, a voice decoding operation for the demodulated signal, a voice encoding operation for a voice, and a modulating operation for a coded voice by a pipeline processing method, comprises:

an arithmetic means for alternately performing a desired one of said demodulating operation, said modulating operation and said synchronizing operation and a desired one of said voice decoding operation and said voice encoding operation;

a first storage means for storing a result of said desired one of said demodulating operation, said modulating operation and said synchronizing operation performed by said arithmetic means; and a second storage means for storing a result of said desired one of said voice decoding operation and said voice encoding operation performed by said arithmetic means.

According to a second aspect of the present invention, an arithmetic unit for performing a demodulating operation for a received signal, a synchronizing operation based on a demodulated signal, a voice decoding operation for the demodulated signal, a voice encoding operation for a voice and a modulating operation for a coded voice by a pipeline processing method, comprises:

an arithmetic means for alternately performing a desired one of said modulating operation and said voice encoding operation and a desired one of said demodulating operation, said synchronizing operation and said voice decoding operation;

a first storage means for storing a result of said desired one of said modulating operation and said voice encoding operation performed by said arithmetic means; and a second storage means for storing a result of said desired one of said demodulating operation, said synchronizing operation and said voice decoding operation performed by said arithmetic means.

According to a third aspect of the present invention, an arithmetic unit for performing a demodulating operation for a received signal, a synchronizing operation based on a demodulated signal, a voice decoding operation for the demodulated signal, a voice encoding operation for a voice and a modulating operation for a coded voice by a pipeline processing method, comprises:

an arithmetic means for alternately performing a desired one of said modulating operation, said synchronizing operation and said voice encoding operation and a desired one of said demodulating operation and said voice decoding operation;

a first storage means for storing a result of said desired one of said modulating operation, said synchronizing operation and said voice encoding operation performed by said arithmetic means; and a second storage means for storing a result of said desired one of said demodulating operation and said voice decoding operation performed by said arithmetic means.

According to a fourth aspect of the present invention, an arithmetic unit for performing a demodulating operation for a received signal, a synchronizing operation based on a demodulated signal, a voice decoding operation for the demodulated signal, a voice encoding operation for a voice and a modulating operation for a coded voice by a pipeline processing method, comprises:

an arithmetic means for successively performing a desired one of said modulating operation and said voice encoding operation a desired one of said demodulating operation and said voice decoding operation, and said synchronizing operation;

a first storage means for storing a result of said desired one of said modulating operation and said voice encoding operation performed by said arithmetic means;

a second storage means for storing a result of said desired one of said demodulating operation and said voice decoding operation performed by said arithmetic means; and a third storage means for storing a result of said synchronizing operation performed by said arithmetic means.

According to a fifth aspect of the present invention, an arithmetic unit for performing a demodulating operation for a received signal, a synchronizing operation based on a demodulated signal, a voice decoding operation for the demodulated signal, a voice encoding operation for a voice and a modulating operation for a coded voice by a pipeline processing method, comprises:

an arithmetic means for successively performing a desired one of said modulating operation and said demodulating operation, a desired one of said voice decoding operation and said voice encoding operation, and said synchronizing operation;

a first storage means for storing a result of said desired one of said modulating operation and said demodulating operation performed by said arithmetic means;

a second storage means for storing a result of said desired one of said voice decoding operation and said voice encoding operation performed by said arithmetic means; and a third storage means for storing a result of said synchronizing operation performed by said arithmetic means.

According to a sixth aspect of the present invention, an arithmetic unit for performing a demodulating operation for a received signal, a synchronizing operation based on a demodulated signal, a voice decoding operation for the demodulated signal, a voice encoding operation for a voice and a modulating operation for a coded voice by a pipeline processing method, comprises:

an arithmetic means for successively performing said modulating operation, said demodulating operation, said voice encoding operation, said voice decoding operation and said synchronizing operation;

a first storage means for storing a result of said modulating operation performed by said arithmetic means;

a second storage means for storing a result of said demodulating operation performed by said arithmetic means;

a third storage means for storing a result of said voice encoding operation performed by said arithmetic means;

a fourth storage means for storing a result of said voice decoding operation performed by said arithmetic means; and a fifth storage means for storing a result of said synchronizing operation performed by said arithmetic means.

According to a seventh aspect of the present invention, an arithmetic unit provided with a pipeline configuration for executing n instruction sequences successively, comprises:

a processor;

n holding meas for holding a condition of said processor; and a set of arithmetic means.

DESCRIPTION OF THE PREFERRED EMBODIMENTS

Figure 4:
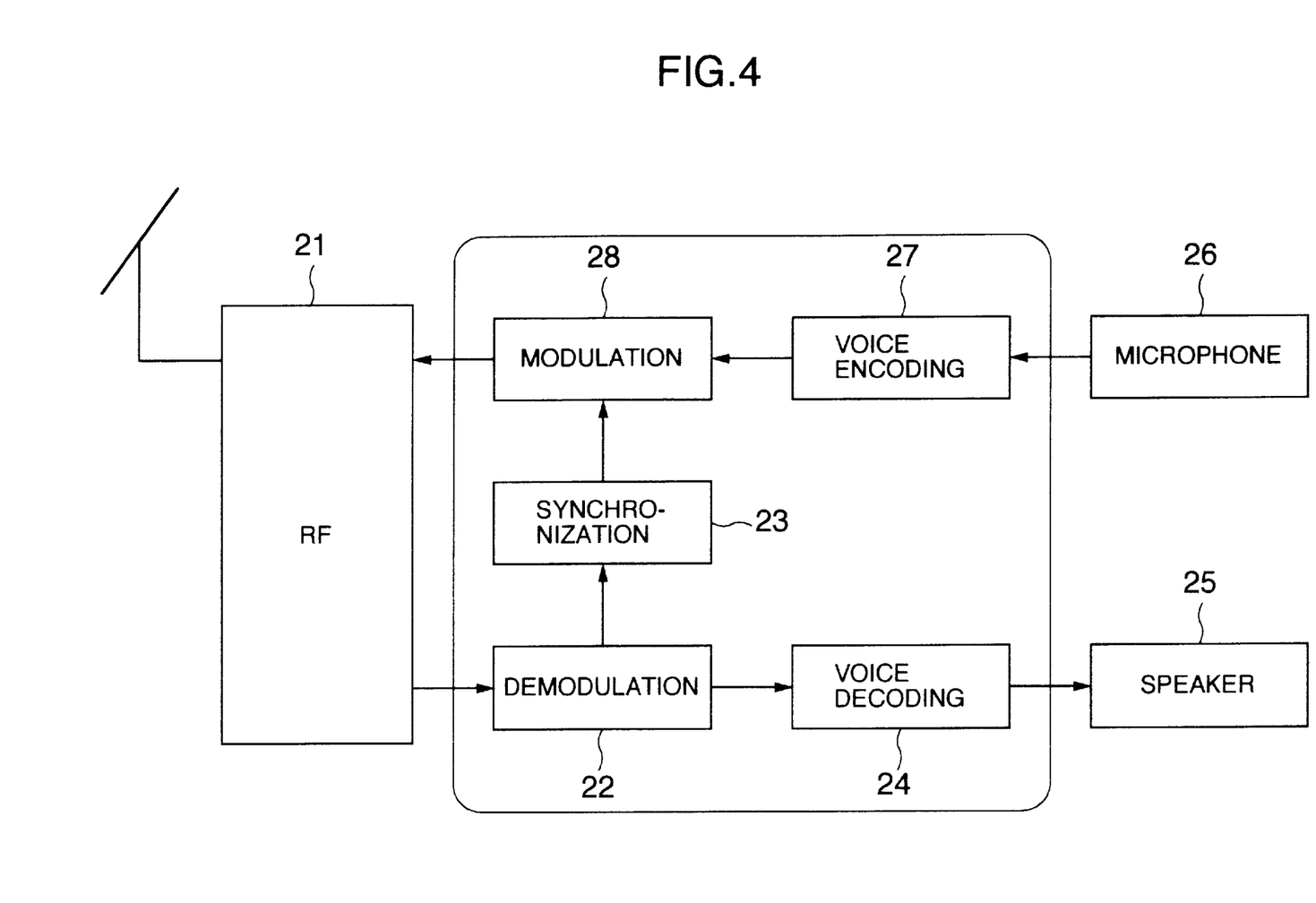
FIG. 4 is a block diagram showing a mobile communication apparatus to which an arithmetic unit according to an embodiment of the present invention can be applied.

A mobile communication apparatus depicted in FIG. 4 comprises an RF portion 21 for processing a high-frequency-band signal, a demodulation portion 22 for demodulating an output signal of the RF portion 21, a synchronization portion 23 for performing synchronization on the basis of an output signal of the demodulation portion 22, an voice decoding portion 24 for voice-decoding the output signal of the demodulation portion 22, a speaker 25 for reproducing a voice decoded by the voice decoding portion 24, a microphone 26, a voice encoding portion 27 for encoding a voice inputted through the microphone 26, and a modulation portion 28 for modulating coded data inputted through the voice encoding portion 27.

In the mobile communication apparatus configured as described above, formation of the demodulation portion 22, the synchronization portion 23, the voice decoding portion 24, the voice encoding portion 27 and the modulation portion 28 by a single processor will be discussed.

When processing is performed by using such a single processor, arithmetic results need be transferred among the respective blocks of the demodulation portion 22, the synchronization portion 23, the voice decoding portion 24, the voice encoding portion 27 and the modulation portion 28, but data in the middle of arithmetic operations in the respective blocks are not dependent on each other among the blocks.

Hereinafter, instructions contained in processing in the voice decoding portion 24 and processing in the voice encoding portion 27 are called "voice encoding/decoding instructions" and instructions contained in processing in the demodulation portion 22, processing in the synchronization portion 23 and processing in the modulation portion 28 are called "modulating/demodulating/synchronizing instructions".

Figure 5:
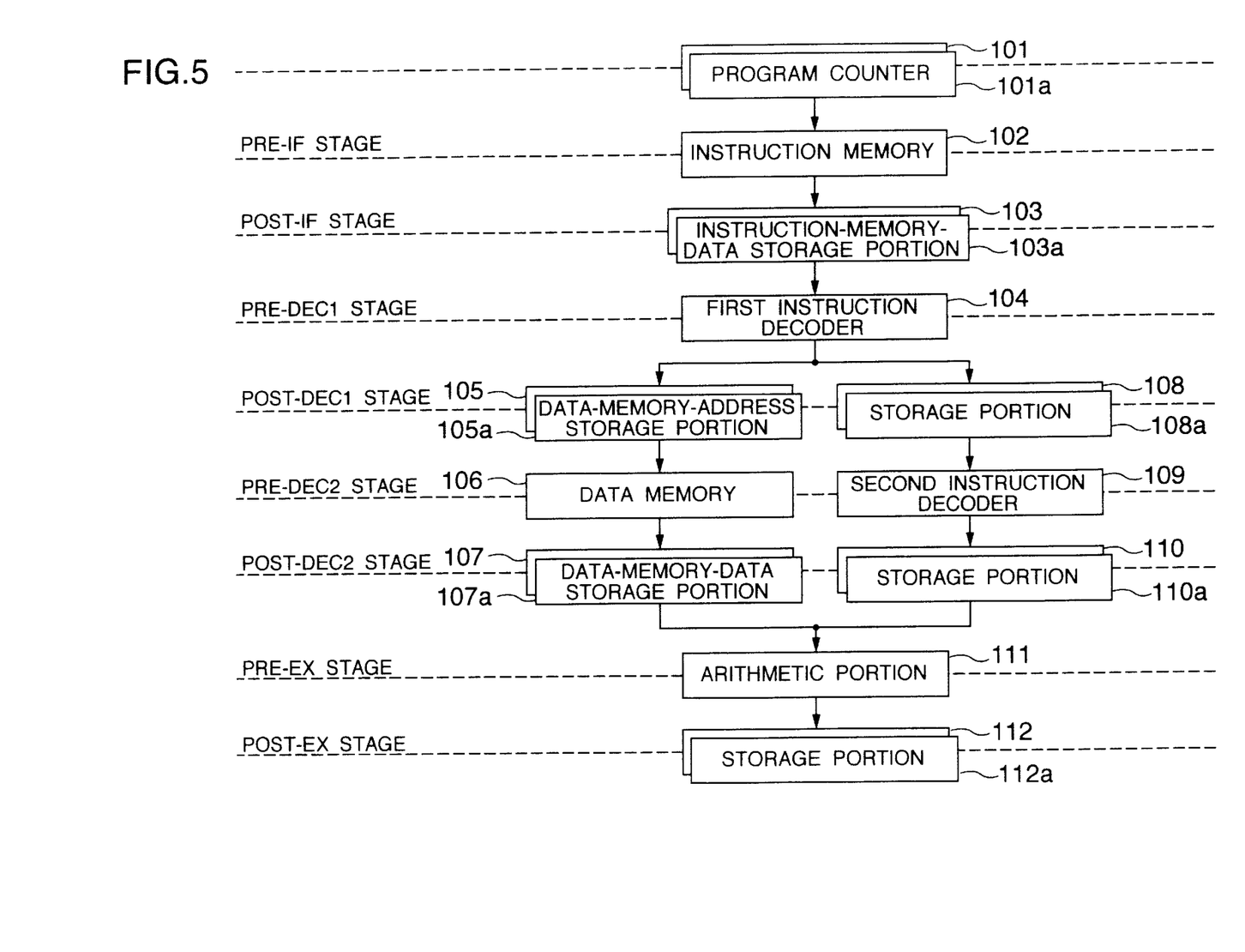
FIG. 5 is a schematic block diagram showing the arithmetic unit according to an embodiment of the present invention.

FIG. 5 shows an arithmetic unit according to an embodiment of the present invention in which pipelines of two instruction sequences of voice encoding/decoding instructions and modulating/demodulating/synchronizing instructions flow.

The arithmetic unit in this embodiment has first and second program counters 101 and 101a for indicating access addresses of an instruction memory 102 which will be described later. Here, the first and second program counters 101 and 101a are used to be alternated every instruction. Specifically, the first program counter 101 is used for executing voice encoding/decoding instructions and the second program counter 101a is used for executing modulating/demodulating/synchronizing instructions.

The arithmetic unit further has an instruction memory 102 in which instruction data are stored, and first and second instruction-memory-data storage portions 103 and 103a in which instruction data outputted from the instruction memory 102 are held. The first and second instruction-memory-data storage portions 103 and 103a are used to be alternated every instruction. Specifically, the first instruction-memory-data storage portion 103 is used for executing voice encoding/decoding instructions and the second instruction-memory-data storage portion 103a is used for executing modulating/demodulating/synchronizing instructions.

The arithmetic unit further has a first instruction decoder 104 for decoding instruction data given from the first and second instruction-memory-data storage portions 103 and 103a and outputting data memory addresses and instruction-temporary-decoded-results, and first and second data-memory-address storage portions 105 and 105a for holding the data memory addresses given from the first instruction decoder 104. The first and second data-memory-address storage portions 105 and 105a are used to be alternated every instruction. Specifically, the first data-memoryaddress storage portion 105 is used for executing voice encoding/decoding instructions and the second data-memory-address storage portion 105a is used for executing modulating/demodulating/synchronizing instructions.

The arithmetic unit further has a data memory 106 which is accessed on the basis of the addresses given from the first and second data-memory-address storage portions 105 and 105a and in which output data are stored, and first and second data-memory-data storage portions 107 and 107a for holding the output data given from the data memory 106. The first and second data-memory-data storage portions 107 and 107a are used to be alternated every instruction. Specifically, the first data-memory-data storage portion 107 is used for executing voice encoding/decoding instructions and the second data-memory-data storage portion 107a is used for executing modulating/demodulating/synchronizing instructions.

The arithmetic unit further has first and second storage portions 108 and 108a for holding the instruction-temporary-decoded-results given from the first instruction decoder 104. The first and second storage portions 108 and 108a are used to be alternated every instruction. Specifically, the first storage portion 108 is used for executing voice encoding/decoding instructions and the second storage portion 108a is used for executing modulating/demodulating/synchronizing instructions.

The arithmetic unit further has a second instruction decoder 109 for decoding the instruction-temporary-decoded-results given from the first and second storage portions 108 and 108a, and third and fourth storage portions 110 and 110a for holding the decoded results given from the second instruction decoder 109. The third and fourth storage portions 110 and 110a are used to be alternated every instruction. Specifically, the third storage portion 110 is used for executing voice encoding/decoding instructions and the fourth storage portion 110a is used for executing modulating/demodulating/synchronizing instructions.

The arithmetic unit further has an arithmetic portion 111 for performing an arithmetic operation for output data given from the first and second data-memory-data storage portions 107 and 107a, on the basis of contents designated by the decoded results which are given from the third and fourth storage portions 110 and 110a, and fifth and sixth storage portions 112 and 112a for holding arithmetic results which are given from the arithmetic portion 111. The fifth and sixth storage portions 112 and 112a are used to be alternated every instruction. Specifically, the fifth storage portion 112 is used for executing voice encoding/decoding instructions and the sixth storage portion 112a is used for executing modulating/demodulating/synchronizing instructions.

The operation in the respective pipeline stages, shown in FIG. 5, of the arithmetic unit configured as described above will be described below with reference to FIG. 6 which is a pipeline configuration view.

Pre-IF Stage and Post-IF Stage

At time T1, an address is outputted from the first program counter 101 to the instruction memory 102 and then the value of the first program counter 101 is incremented by one (pre-IF stage for voice encoding/decoding instruction i). At time T2, an instruction data stored in the address which is given from the first program counter 101 to the instruction memory 102 at time T1 is outputted from the instruction memory 102 to the first instruction-memory-data storage portion 103 and held in the first instruction-memory-data storage portion 103 (post-IF stage for voice encoding/decoding instruction i). Here, pipeline latches may be pro-vided in the inside of the instruction memory 102 or a wave pipeline configuration may be used in the instruction memory 102 in order to separate an IF stage into a pre-IF stage and a post-IF stage.

Incidentally, at time T2, an address is outputted from the second program counter 101a to the instruction memory 102 and then the value of the second program counter 101a is incremented by one (pre-IF stage for modulating/demodulating/synchronizing instruction j).

Pre-DEC1 Stage and Post-DEC1 Stage

At time T3, the instruction data held in the first instruction-memory-data storage portion 103 at time T2 is decoded by the first instruction decoder 104 to thereby generate a data memory address and an instruction-temporary-decoded-result to be used in the next DEC2 stage (pre-DEC1 stage for voice encoding/decoding instruction i). At time T4, the data memory address and the instruction-temporary-decoded-result generated by the first instruction decoder 104 at time T3 are stored in the first data memory address storage portion 105 and the first storage portion 108 respectively (post-DEC1 stage for voice encoding/decoding instruction i). Here, pipeline latches may be provided in the inside of the first instruction decoder 104 or a wave pipeline configuration may be used in the first instruction decoder 104 in order to separate a DEC1 stage into a pre-DEC1 stage and a post-DEC1 stage.

Incidentally, at time T3, the instruction data stored in the address which is given from the second program counter 101a to the instruction memory 102 at time T2 is outputted from the instruction memory 102 to the second instruction-memory-data storage portion 103a and held in the second instruction-memory-data storage portion 103a (post-IF stage for modulating/demodulating/synchronizing instruction j) and, at the same time, an address is outputted from the first program counter 101 to the instruction memory 102 and then the value of the first program counter 101 is incremented by one (pre-IF stage for voice encoding/decoding instruction i+1).

At time T4, the instruction data held in the second instruction-memory-data storage portion 103a at time T3 is decoded by the first instruction decoder 104 to thereby generate a data memory address and an instruction-temporary-decoded-result to be used in the next DEC2 stage (pre-DEC1 stage for modulating/demodulating/synchronizing instruction j). The instruction data held in the address which is given from the first program counter 101 to the instruction memory 102 at time T3 is outputted from the instruction memory 102 to the first instruction-memory-data storage portion 103 and held in the first instruction-memory-data storage portion 103 (post-IF stage for voice encoding/decoding instruction i+1) and, at the same time, an address is outputted from the second program counter 101a to the instruction memory 102 and then the value of the second program counter 101a is incremented by one (pre-IF stage for modulating/demodulating/synchronizing instruction j+1).

Pre-DEC2 Stage and Post-DEC2 Stage

At time T5, the data memory 106 is accessed on the basis of the data memory address which is outputted from the first data memory address storage portion 105 and, at the same time, the instruction-temporary-decoded-result held in the first storage portion 108 at time T4 is decoded by the second instruction decoder 109 into a signal format which is necessary for the next EX stage (pre-DEC2 stage for voice encoding/decoding instruction i). At time T6, the output data from the data memory 106 is held in the first data-memory-data storage portion 107 and, at the same time, the data decoded by the second instruction decoder 109 is held in the third storage portion 110 (post-DEC2 stage for voice encoding/decoding instruction i). Here, pipeline latches may be provided in the inside of the data memory 106 and the second instruction decoder 109 or a wave pipeline configuration may be used in the data memory 106 and the second instruction decoder 109 in order to separate a DEC2 stage into a pre-DEC2 stage and a post-DEC2 stage.

Incidentally, at time T5, the data memory address and the instruction-temporary-decoded-result generated by the first instruction decoder 104 at time T4 are held in the second data memory address storage portion 105a and the second storage portion 108a respectively (post-DEC1 stage for modulating/demodulating/synchronizing instruction j). The instruction data held in the first instruction-memory-data storage portion 103 at time T4 is decoded by the first instruction decoder 104 to thereby generate a data memory address and an instruction-temporary-decoded-result to be used in the next DEC2 stage (pre-DEC1 stage for voice encoding/decoding instruction i+1). The instruction data stored in the address which is given from the second program counter 101a to the instruction memory 102 at time T4 is outputted from the instruction memory 102 to the second instruction-memory-data storage portion 103a and held in the second instruction-memory-data storage portion 103a (post-IF stage for modulating/demodulating/ synchronizing instruction j+1) and, at the same time, an address is outputted from the first program counter 101 to the instruction memory 102 and then the value of the first program counter 101 is incremented by one (pre-IF stage for voice encoding/decoding instruction i+2).

At time T6, the data memory 106 is accessed on the basis of the data memory address which is outputted from the second data memory address storage portion 105a and, at the same time, the instruction-temporary-decoded-result held in the second storage portion 108a at time T5 is decoded by the second instruction decoder 109 into a signal format which is necessary for the next EX stage (pre-DEC2 stage for modulating/demodulating/synchronizing instruction j). The data memory address and the instruction-temporary-decoded-result generated by the first instruction decoder 104 at time T5 are held in the first data memory address storage portion 105 and the first storage portion 108 respectively (post-DEC1 stage for voice encoding/decoding instruction i+1). The instruction data held in the second instruction-memory-data storage portion 103a at time T5 is decoded by the first instruction decoder 104 to thereby generate a data memory address and an instruction-temporary-decoded-result to be used in the next DEC2 stage (pre-DEC1 stage for modulating/demodulating/synchronizing instruction j+1). The instruction data stored in the address which is given from the first program counter 101 to the instruction memory 102 at time T5 is outputted from the instruction memory 102 to the first instruction-memory-data storage portion 103 and held in the first instruction-memory-data storage portion 103 (post-IF stage for voice encoding/ decoding instruction i+2) and, at the same time, an address is outputted from the second program counter 101a to the instruction memory 102 and then the value of the second program counter 101a is incremented by one (pre-IF stage for modulating/demodulating/synchronizing instruction j+2).

Pre-EX Stage and Post-EX Stage

At time T7, the arithmetic portion 111 performs an arithmetic operation for the output data from the first data-memory-data storage portion 107 on the basis of contents designated by the output signal of the third storage portion 110 (pre-EX stage for voice encoding/decoding instruction i). At time T8, the arithmetic result in the arithmetic portion 111 is held in the fifth storage portion 112 (post-EX stage for voice encoding/decoding instruction i). Here, pipeline latches may be provided in the inside of the arithmetic portion 111 or a wave pipeline configuration may be used in the arithmetic portion 111 in order to separate an EX stage into a pre-EX stage and a post-EX stage.

Incidentally, at time T7, the output data from the data memory 106 is held in the second data-memory-data storage portion 107a and, at the same time, the data decoded by the second instruction decoder 109 at time T6 is held in the fourth storage portion 110a (post-DEC2 stage for modulating/demodulating/synchronizing instruction j). The data memory 106 is accessed on the basis of the data memory address outputted from the first data memory address storage portion 105 and, at the same time, the instruction-temporary-decoded-result held in the first storage portion 108 at time T6 is decoded by the second instruction decoder 109 into a signal format which is necessary for the next EX stage (pre-DEC2 stage for voice encoding/decoding instruction i+1). The data memory address and the instruction-temporary-decoded-result generated by the first instruction decoder 104 at time T6 are held in the second data memory address storage portion 105a and the second storage portion 108a respectively (post-DEC1 stage for modulating/demodulating/synchronizing instruction j+1). The data instruction held in the first instruction-memory-data storage portion 103 at time T6 is decoded by the first instruction decoder 104 to thereby generate a data memory address and an instruction-temporary-decoded-result to be used in the next DEC2 stage (pre-DEC1 stage for voice encoding/decoding instruction i+2). The instruction data stored in the address which is given from the second program counter 101a to the instruction memory 102 at time T6 is outputted from the instruction memory 102 to the second instruction-memory-data storage portion 103a and held in the second instruction-memory-data storage portion 103a (post-IF stage for modulating/demodulating/ synchronizing instruction j+2) and, at the same time, an address is outputted from the first program counter 101 to the instruction memory 102 and then the value of the first program counter 101 is incremented by one (pre-IF stage for voice encoding/decoding instruction i+3).

Further, at time T8, the arithmetic portion 111 performs an arithmetic operation for the output data from the second data-memory-data storage portion 107a on the basis of contents designated by the output signal of the fourth storage portion 110a (pre-EX stage for modulating/demodulating/ synchronizing instruction j). The output data from the data memory 106 is held in the first data-memory-data storage portion 107 and, at the same time, the data decoded by the second instruction decoder 109 is held in the third storage portion 110 (post-DEC2 stage for voice encoding/decoding instruction i+1). The data memory 106 is accessed on the basis of the data memory address which is outputted from the second data memory address storage portion 105a and, at the same time, the instruction-temporary-decoded-result held in the second storage portion 108a at time T7 is decoded by the second instruction decoder 109 into a signal format which is necessary for the next EX stage (pre-DEC2 stage for modulating/demodulating/synchronizing instruction j+1). The data memory address and the instruction-temporary-decoded-result generated by the first instruction decoder 104 at time T7 are held in the first data memory address storage portion 105 and the first storage portion 108 respectively (post-DEC1 stage for voice encoding/decoding instruction i+2). The instruction data held in the second instruction-memory-data storage portion 103a at time T7 is decoded by the first instruction decoder 104 to thereby generate a data memory address and an instruction-temporary-decoded-result to be used in the next DEC2 stage (pre-DEC1 stage for modulating/demodulating/synchronizing instruction j+2). The instruction data stored in the address which is given from the first program counter 101 to the instruction memory 102 at time T7 is outputted from the instruction memory 102 to the first instruction-memory-data storage portion 103 and held in the first instruction-memory-data storage portion 103 (post-IF stage for voice encoding/decoding instruction i+3) and, at the same time, an address is outputted from the second program counter 101a to the instruction memory 102 and then the value of the second program counter 101a is incremented by one (pre-IF stage for modulating/demodulating/synchronizing instruction j+3).

Figure 7:
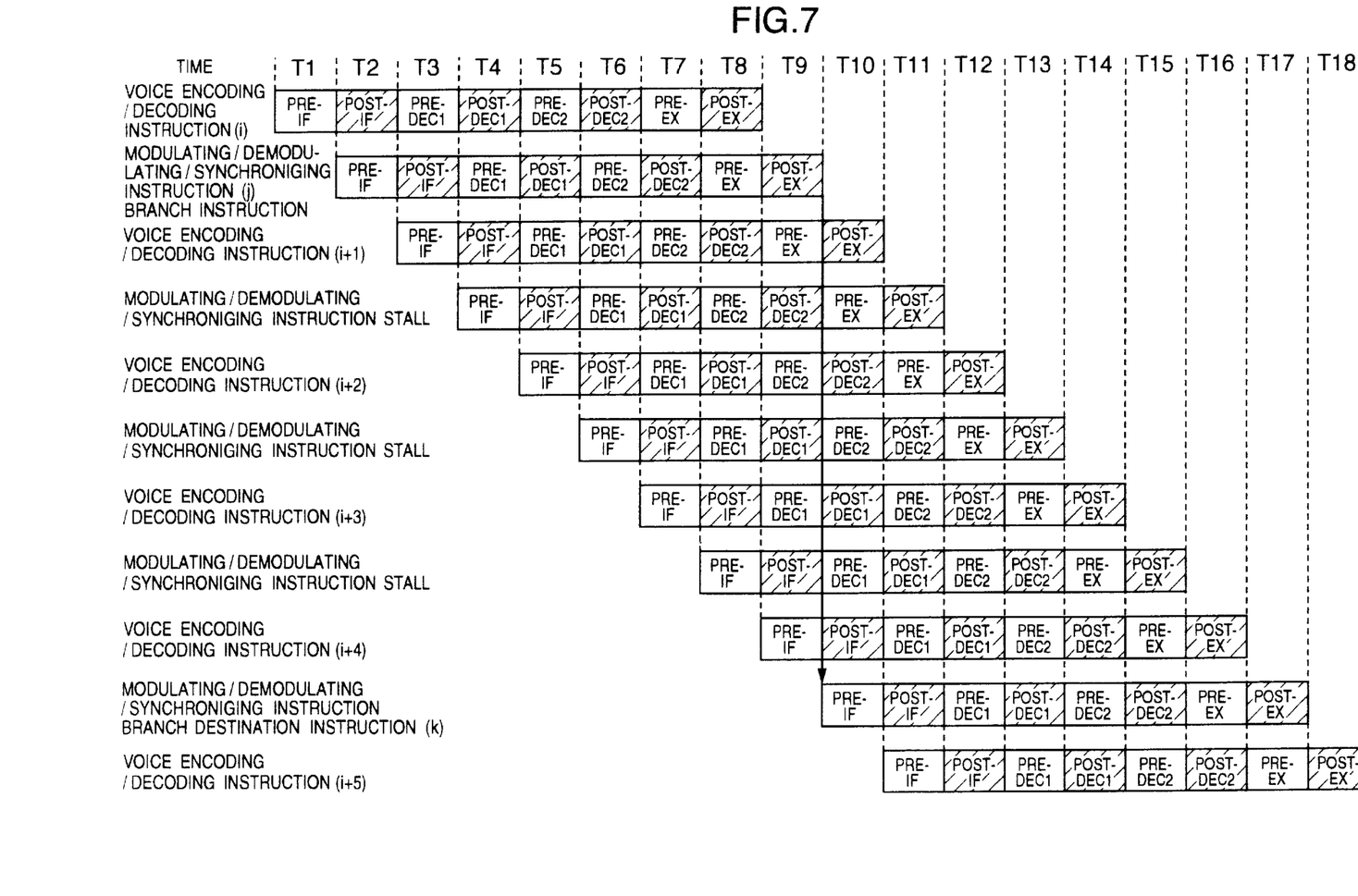
FIG. 7 is a view showing a pipeline configuration at the time of execution of a branch instruction in the arithmetic unit depicted in FIG. 5.

The operation of the arithmetic unit according to this embodiment in the case where a branch instruction occurs in the modulating/demodulating/synchronizing instruction j will be described below with reference to FIG. 7 which is a pipeline configuration view.

When a branch instruction occurs in the modulating/demodulating/synchronizing instruction j, the address indicated by the first program counter 101 is not determined unless a branch destination is found, and the branch destination is found after completion of the post-EX stage for modulating/demodulating/synchronizing instruction j at time T9. As a result, stalling occurs in modulating/demodulating/synchronizing instructions unless the address indicated by the first program counter 101 is determined (that is, before time T9). Because voice encoding/decoding instructions, however, operate on the basis of addresses indicated by the second program counter 101a, the aforementioned operation is performed without occurrence of stalling.

Accordingly, in the arithmetic unit according to this embodiment configured as shown in FIG. 5, because the time of occurrence of stalling can be reduced, pipelines can be used effectively even in the case where a branch instruction occurs. Although FIG. 7 shows the case where a branch instruction occurs in a modulating/demodulating/synchronizing instruction, this rule can be also applied to the case where a branch instruction occurs in a voice encoding/decoding instruction. That is, even in the case where a branch instruction occurs in a voice encoding/decoding instruction, the time of occurrence of stalling can be reduced because stalling does not occur in modulating/demodulating/synchronizing instructions but it occurs only in voice encoding/decoding instructions.

Although this embodiment has shown the case where the arithmetic unit executes two kinds of instruction sequences in eight pipeline stages, the same effect can be obtained also in the case where the number of pipeline stages or the number of instruction sequences is changed.

The effect of reducing the wait cycle in which pipelines stop when instructions using the previous arithmetic result are inputted continuously will be described below.

Figure 6:
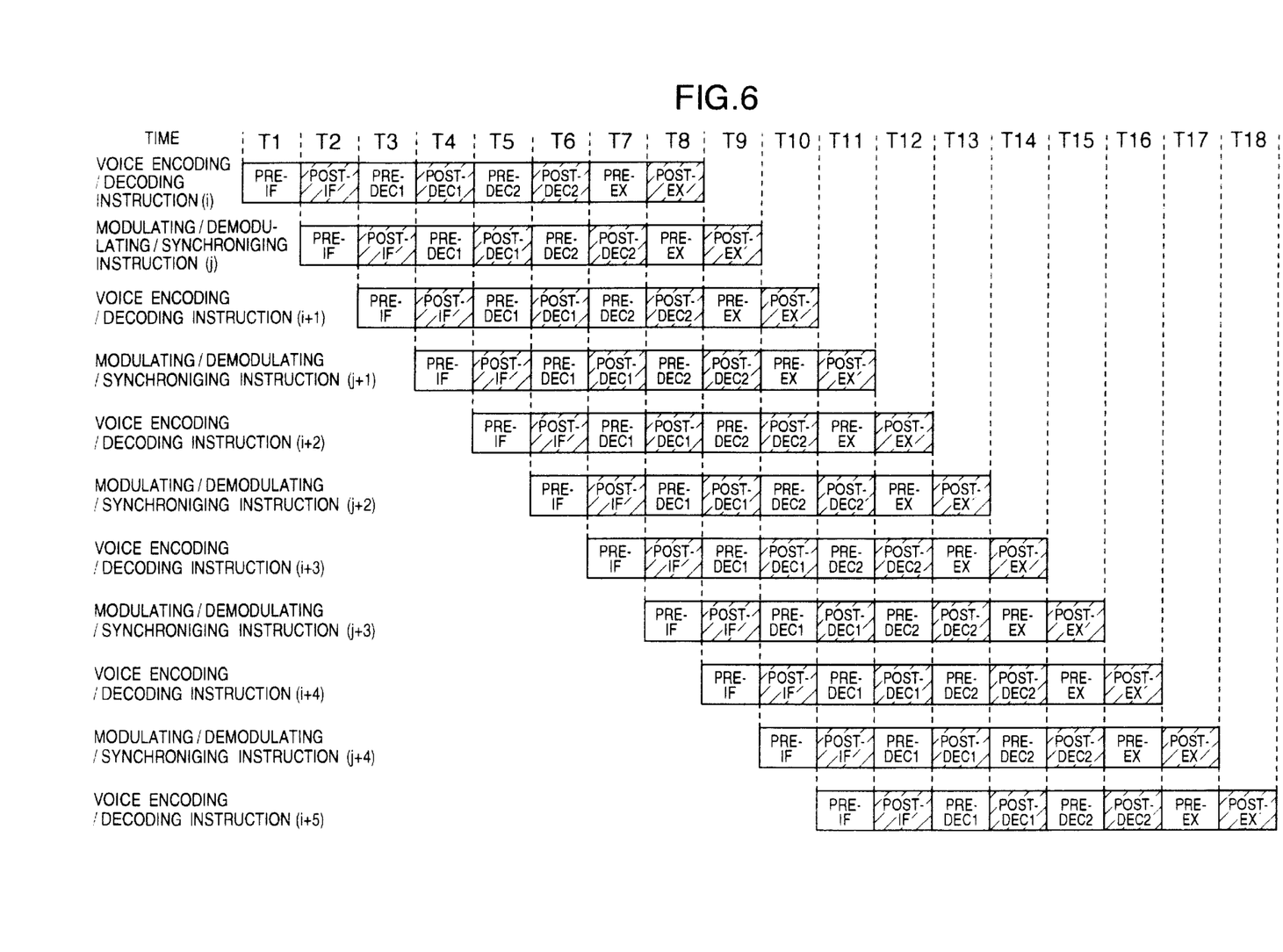
FIG. 6 is a pipeline configuration view for explaining operations in respective pipeline stages of the arithmetic unit depicted in FIG. 5.

In FIG. 6, the voice encoding/decoding instruction i is an instruction which is such that the arithmetic result is determined after the post-EX stage is completed. Before the pre-EX stage for the next voice encoding/decoding instruction i+1 is executed, the post-EX stage for the voice encoding/decoding instruction i is completed (time T8). Accordingly, the voice encoding/decoding instruction i+1 can use the arithmetic result of the voice encoding/decoding instruction i. Similarly, modulating/demodulating/synchronizing instruction j+1 can use the arithmetic result of modulating/demodulating/synchronizing instruction j.

As described above, in the arithmetic unit according to this embodiment, pipelines can be used effectively even in the case where instructions using the previous arithmetic result are inputted continuously.

Although the above description has been made upon the case where two kinds of instruction sequences are executed in eight pipeline stages, the same effect can be obtained also in the case where the number of pipeline stages or the number of instruction sequences is changed.

Furthermore, the case of instruction separation into voice encoding/decoding instructions and modulating/demodulating/synchronizing instructions is adapted to program development by team because software development can be made while separated by viewpoints of technical experts concerning voice encoding/decoding and technical experts concerning modulation/demodulation/synchronization.

Furthermore, among voice encoding, voice decoding, modulation, demodulation and synchronization, voice encoding and demodulation require a larger deal of processing. On the other hand, modulation, voice decoding and synchronization require a smaller deal of processing. Therefore, the quantities of processing required for two instruction sequences can be equalized by separating instructions into a voice encoding/decoding instruction sequence and a modulating/demodulating/synchronizing instruction sequence so that the two instruction sequences flow.

On the other hand, if an arithmetic operation is separated into an arithmetic operation for modulation/voice encoding and an arithmetic operation for demodulation/synchronization/voice decoding, voice encoding can be started immediately after modulation or voice demodulation can be started immediately after demodulation. Accordingly, there arises an advantage that the delay of processing can be shortened.

Similarly, if an arithmetic operation is separated into an arithmetic operation for modulation/synchronization/voice encoding and an arithmetic operation for demodulation/voice decoding, the delay of processing can be also shortened as described above. In the aforementioned separation method and this separation method, the quantities of processing can be made uniform by adding synchronization to one of groups of (modulation+voice encoding) and (demodulation+voice decoding) which is smaller in the quantity of processing.

If an arithmetic operation is separated into an arithmetic operation for modulation/voice encoding, an arithmetic operation for demodulation/voice decoding and an arithmetic operation for synchronization, timing control in signal processing can be made more accurately because synchronization can be made continuously. Furthermore, as described above, in this separation method, the delay of processing can be shortened.

If an arithmetic operation is separated into an arithmetic operation for modulation/demodulation, an arithmetic operation for voice encoding/decoding and an arithmetic operation for synchronization, timing control in signal processing can be made more accurately because synchronization can be made continuously as described above. Furthermore, this separation method is adapted to team development because development can be made while separated into development by voice signal processing developers and development by modulation/demodulation signal processing developers as described above.

As an apparatus for processing a plurality of instructions simultaneously in the same manner as in the present invention, there is a processing apparatus disclosed in JP-A-5-298093. In this JP-A-5-298093, there is description about a method for compensating for lowering of processing efficiency in a branch instruction in the processing apparatus but there is no description about a plurality of programs to be executed. As shown in the aforementioned embodiment, the present invention is different from the conventional processing apparatus in the configuration concerning the allocation of a plurality of instruction sequences in a communication apparatus and the advantages thereof.

Furthermore, the embodiment according to the present invention has the following advantages which are not mentioned in JP-A-5-298093.

(1) Even in the case where instructions using previous arithmetic results are inputted continuously, pipelines can be used effectively.

(2) Because software development can be allotted to technical experts according to their special fields by an idea of separation of processing, the present invention is adapted to program development by team.

(3) The idea of separation of processing brings about an advantage that the delay of processing can be shortened.

(4) Timing control can be made more accurately by the idea of separation of processing.

As described above, according to the present invention, pipelines can be used effectively even in the case where a branch instruction occurs, so that pipelines can be used effectively even in the case where instructions using previous arithmetic results are inputted continuously. Accordingly, because lowering of arithmetic ability is avoided even in the case where pipelines are taken deeply, pipelines can be taken deeply so that the operating rate can be improved. Furthermore, because software development can be allotted to technical experts in accordance with their special fields by an idea of separation of processing, the present invention is adapted to program development by team. Furthermore, not only the delay of processing can be shortened by the idea of separation of processing but also timing control can be made more accurately by the idea of separation of processing. Accordingly, an arithmetic unit of high performance can be provided.

What is claimed is:

1. An arithmetic unit for performing a demodulating operation for a received signal to produce a demodulated signal and then performing a synchronizing operation based on the demodulated signal and a voice decoding operation for the demodulated signal, and for performing a voice encoding operation for a voice signal to produce a coded voice signal and a modulating operation for the coded voice signal, wherein the demodulating operation, the synchronizing operation, the voice decoding operation, the voice encoding operation and the modulating operation are performed in a pipeline mode, the arithmetic unit comprising a pipeline configuration including:

a first storage means for storing first instruction data which instruct the arithmetic unit to perform one of the demodulating operation, the modulating operation and the synchronizing operation;

a second storage means for storing second instruction data which instruct the arithmetic unit to perform one of the voice decoding operation and the voice encoding operation;

an arithmetic means for operating in said pipeline mode to (i) alternately receive the first instruction data and the second instruction data and (ii) alternately perform said one of said demodulating operation, said modulating operation and said synchronizing operation and said one of said voice decoding operation and said voice encoding operation;

a third storage means for storing a result of said one of said demodulating operation, said modulating operation and said synchronizing operation performed by said arithmetic means; and a fourth storage means for storing a result of said one of said voice decoding operation and said voice encoding operation performed by said arithmetic means.

2. An arithmetic unit for performing a demodulating operation for a received signal to produce a demodulated signal and then performing a synchronizing operation based on the demodulated signal and a voice decoding operation for the demodulated signal, and for performing a voice encoding operation for a voice signal to produce a coded voice signal and a modulating operation for the coded voice signal, wherein the demodulating operation, the synchronizing operation, the voice decoding operation, the voice encoding operation and the modulating operation are performed in a pipeline mode, the arithmetic unit comprising a pipeline configuration including:

a first storage means for storing first instruction data which instruct the arithmetic unit to perform one of the modulating operation and the voice encoding operation;

a second storage means for storing second instruction data which instruct the arithmetic unit to perform one of the demodulating operation, the synchronizing operation and the voice decoding operation;

an arithmetic means for operating in said pipeline mode to (i) alternately receive the first instruction data and the second instruction data and (ii) alternately perform said one of said modulating operation and said voice encoding operation and said one of said demodulating operation, said synchronizing operation and said voice decoding operation;

a third storage means for storing a result of said one of said modulating operation and said voice encoding operation performed by said arithmetic means; and a fourth storage means for storing a result of said one of said demodulating operation, said synchronizing operation and said voice decoding operation performed by said arithmetic means.

3. An arithmetic unit for performing a demodulating operation for a received signal to produce a demodulated signal and then performing a synchronizing operation based on the demodulated signal and a voice decoding operation for the demodulated signal, and for performing a voice encoding operation for a voice signal to produce a coded voice signal and a modulating operation for the coded voice signal, wherein the demodulating operation, the synchronizing operation, the voice decoding operation, the voice encoding operation and the modulating operation are performed in a pipeline mode, the arithmetic unit comprising a pipeline configuration including:

a first storage means for storing first instruction data which instruct the arithmetic unit to perform one of the modulating operation, the synchronizing operation and the voice encoding operation;

a second storage means for storing second instruction data which instruct the arithmetic unit to perform one of the demodulating operation and the voice decoding operation;

an arithmetic means for operating in said pipeline mode to (i) alternately receive the first instruction data and the second instruction data and ii alternately perform said one of said modulating operation, said synchronizing operation and said voice encoding operation and said one of said demodulating operation and said voice decoding operation;

a third storage means for storing a result of said one of said modulating operation, said synchronizing operation and said voice encoding operation performed by said arithmetic means; and a fourth storage means for storing a result of said one of said demodulating operation and said voice decoding operation performed by said arithmetic means.

4. An arithmetic unit for performing a demodulating operation for a received signal to produce a demodulated signal and then performing a synchronizing operation based on the demodulated signal and a voice decoding operation for the demodulated signal, and for performing a voice encoding operation for a voice signal to produce a coded voice signal and a modulating operation for the coded voice signal, wherein the demodulating operation, the synchronizing operation, the voice decoding operation, the voice encoding operation and the modulating operation are performed in a pipeline mode, the arithmetic unit comprising a pipeline configuration including:

a first storage means for storing first instruction data which instruct the arithmetic unit to perform one of the modulating operation and the voice encoding operation;

a second storage means for storing second instruction data which instruct the arithmetic unit to perform one of the demodulating operation and the voice decoding operation;

a third storage means for storing third instruction data which instruct the arithmetic unit to perform the synchronizing operation;

an arithmetic means for operating in said pipeline mode to (i) successively receive the first instruction data, the second instruction data and the third instruction data and (ii) successively perform said one of said modulating operation and said voice encoding operation, said one of said demodulating operation and said voice decoding operation, and said synchronizing operation;

a fourth storage means for storing a result of said one of said modulating operation and said voice encoding operation performed by said arithmetic means;

a fifth storage means for storing a result of said one of said demodulating operation and said voice decoding operation performed by said arithmetic means; and a sixth storage means for storing a result of said synchronizing operation performed by said arithmetic means.

5. An arithmetic unit for performing a demodulating operation for a received signal to produce a demodulated signal and then performing a synchronizing operation based on the demodulated signal and a voice decoding operation for the demodulated signal, and for performing a voice encoding operation for a voice signal to produce a coded voice signal and a modulating operation for the coded voice signal, wherein the demodulating operation, the synchronizing operation, the voice decoding operation, the voice encoding operation and the modulating operation are performed in a pipeline mode, the arithmetic unit comprising a pipeline configuration including:

a first storage means for storing first instruction data which instruct the arithmetic unit to perform one of the modulating operation and the demodulating operation;

a second storage means for storing second instruction data which instruct the arithmetic unit to perform one of the voice encoding operation and the voice decoding operation;

a third storage means for storing third instruction data which instruct the arithmetic unit to perform the synchronizing operation;

an arithmetic means for operating in said pipeline mode to (i) successively receive the first instruction data, the second instruction data and the third instruction data and (ii) successively perform said one of said modulating operation and said voice encoding operation, said one of said demodulating operation and said voice decoding operation, and said synchronizing operation;

a fourth storage means for storing a result of said one of said modulating operation and said demodulating operation performed by said arithmetic means;

a fifth storage means for storing a result of said one of said voice decoding operation and said voice encoding operation performed by said arithmetic means; and a sixth storage means for storing a result of said synchronizing operation performed by said arithmetic means.

6. An arithmetic unit for performing a demodulating operation for a received signal to produce a demodulated signal and then performing a synchronizing operation based on the demodulated signal and a voice decoding operation for the demodulated signal, and for performing a voice encoding operation for a voice signal to produce a coded voice signal and a modulating operation for the coded voice signal, wherein the demodulating operation, the synchronizing operation, the voice decoding operation, the voice encoding operation and the modulating operation are performed in a pipeline mode, the arithmetic unit comprising a pipeline configuration including:

a first storage means for storing first instruction data which instruct the arithmetic unit to perform the modulating operation;

a second storage means for storing second instruction data which instruct the arithmetic unit to perform the demodulating operation;

a third storage means for storing third instruction data which instruct the arithmetic unit to perform the voice encoding operation;

a fourth storage means for storing fourth instruction data which instruct the arithmetic unit to perform the voice decoding operation;

a fifth storage means for storing fifth instruction data which instruct the arithmetic unit to perform the synchronizing operation;

an arithmetic means for operating in said pipeline mode to (i) successively receive the first instruction data, the second instruction data, the third instruction data, the fourth instruction data and the fifth instruction data and (ii) successively perform said modulating operation, said demodulating operation, said voice encoding operation, said voice decoding operation and said synchronizing operation;

a sixth storage means for storing a result of said modulating operation performed by said arithmetic means;

a seventh storage means for storing a result of said demodulating operation performed by said arithmetic means;

an eighth storage means for storing a result of said voice encoding operation performed by said arithmetic means;

a ninth storage means for storing a result of said voice decoding operation performed by said arithmetic means; and a tenth storage means for storing a result of said synchronizing operation performed by said arithmetic means.

7. An arithmetic unit for executing first through n-th arithmetic operations in a pipeline mode, the arithmetic unit comprising a pipeline configuration including:

first through n-th storage means for storing first through n-th instruction data which instruct the arithmetic unit to perform the first through n-th arithmetic operations, respectively;

an arithmetic means for operating in said pipeline mode to (i) successively receive the first through n-th instruction data and (ii) successively perform the first through n-th arithmetic operations according to the first through n-th instruction data; and (n+1)th through 2n-th storage means for storing results of the first through n-th arithmetic operations, wherein:

said first through n-th arithmetic operations comprise a demodulating operation for a received signal to produce a demodulated signal, a synchronizing operation based on the demodulated signal, a voice decoding operation for the demodulated signal, a voice encoding operation for a voice signal to produce a coded voice signal and a modulating operation for the coded voice signal; and said arithmetic means operates in said pipeline mode to alternately perform (i) a desired one of said demodulating operation, said modulating operation and said synchronizing operation, and (ii) a desired one of said voice decoding operation and said voice encoding operation.

8. An arithmetic unit for executing first through n-th arithmetic operations in a pipeline mode, the arithmetic unit comprising a pipeline configuration including:

first through n-th storage means for storing first through n-th instruction data which instruct the arithmetic unit to perform the first through n-th arithmetic operations, respectively;

an arithmetic means for operating in said pipeline mode to (i) successively receive the first through n-th instruction data and (ii) successively perform the first through n-th arithmetic operations according to the first through n-th instruction data; and (n+1)th through 2n-th storage means for storing results of the first through n-th arithmetic operations, wherein:

said first through n-th arithmetic operations comprise a demodulating operation for a received signal to produce a demodulated signal, a synchronizing operation based on the demodulated signal, a voice decoding operation for the demodulated signal, a voice encoding operation for a voice signal to produce a coded voice signal and a modulating operation for the coded voice signal; and said arithmetic means operates in said pipeline mode to alternately perform (i) a desired one of said modulating operation and (ii) said voice encoding operation, and a desired one of said demodulating operation, said synchronizing operation and said voice decoding operation.

9. An arithmetic unit for executing first through n-th arithmetic operations in a pipeline mode, the arithmetic unit comprising a pipeline configuration including:

first through n-th storage means for storing first through n-th instruction data which instruct the arithmetic unit to perform the first through n-th arithmetic operations, respectively;

an arithmetic means for operating in said pipeline mode to (i) successively receive the first through n-th instruction data and (ii) successively perform the first through n-th arithmetic operations according to the first through n-th instruction data; and (n+1)th through 2n-th storage means for storing results of the first through n-th arithmetic operations, wherein:

the first through n-th arithmetic operations comprise a demodulating operation for a received signal to produce a demodulated signal, a synchronizing operation based on the demodulated signal, a voice decoding operation for the demodulated signal, a voice encoding operation for a voice signal to produce a coded voice signal and a modulating operation for the coded voice signal; and said arithmetic means operates in said pipeline mode to alternately perform (i) a desired one of said modulating operation, said synchronizing operation and said voice encoding operation, and (ii) a desired one of said demodulating operation and said voice decoding operation.

10. An arithmetic unit for executing first through n-th arithmetic operations in a pipeline mode, the arithmetic unit comprising a pipeline configuration including:

first through n-th storage means for storing first through n-th instruction data which instruct the arithmetic unit to perform the first through n-th arithmetic operations, respectively;

an arithmetic means for operating in said pipeline mode to (i) successively receive the first through n-th instruction data and (ii) successively perform the first through n-th arithmetic operations according to the first through n-th instruction data; and (n+1)th through 2n-th storage means for storing results of the first through n-th arithmetic operations, wherein;

the first through n-th arithmetic operations comprise a demodulating operation for a received signal to produce a demodulated signal, a synchronizing operation based on the demodulated signal, a voice decoding operation for the demodulated signal, a voice encoding operation for a voice signal to produce a coded voice signal and a modulating operation for the coded voice signal; and said arithmetic means operates in said pipeline mode to successively perform (i) a desired one of said modulating operation and said voice encoding operation, (ii) a desired one of said demodulating operation and said voice decoding operation, and (iii) said synchronizing operation.

11. An arithmetic unit for executing first through n-th arithmetic operations in a pipeline mode, the arithmetic unit comprising a pipeline configuration including:

first through n-th storage means for storing first through n-th instruction data which instruct the arithmetic unit to perform the first through n-th arithmetic operations, respectively;

an arithmetic means for operating in said pipeline mode to (i) successively receive the first through n-th instruction data and (ii) successively perform the first through n-th arithmetic operations according to the first through n-th instruction data; and (n+1)th through 2n-th storage means for storing results of the first through n-th arithmetic operations, wherein:

the first through n-th arithmetic operations comprise a demodulating operation for a received signal to produce a demodulated signal, a synchronizing operation based on the demodulated signal, a voice decoding operation for the demodulated signal, a voice encoding operation for a voice signal to produce a coded voice signal and a modulating operation for the coded voice signal; and said arithmetic means operates in said pipeline mode to successively perform (i) a desired one of said modulating operation and said demodulating operation, (ii) a desired one of said voice encoding operation and said voice decoding operation, and (iii) said synchronizing operation.

12. An arithmetic unit for executing first through n-th arithmetic operations in a pipeline mode, the arithmetic unit comprising a pipeline configuration including:

first through n-th storage means for storing first through n-th instruction data which instruct the arithmetic unit to perform the first through n-th arithmetic operations, respectively;

an arithmetic means for operating in said pipeline mode to (i) successively receive the first through n-th instruction data and (ii) successively perform the first through n-th arithmetic operations according to the first through n-th instruction data; and (n+1)th through 2n-th storage means for storing results of the first through n-th arithmetic operations, wherein:

the first through n-th arithmetic operations comprise a demodulating operation for a received signal to produce a demodulated signal, a synchronizing operation based on the demodulated signal, a voice decoding operation for the demodulated signal, a voice encoding operation for a voice signal to produce a coded voice signal and a modulating operation for the coded voice signal; and said arithmetic means operates in said pipeline mode to successively perform said modulating operation, said demodulating operation, said voice encoding operation, said voice decoding operation and said synchronizing operation.

* * * * *